(12) United States Patent
Casebolt et al.

(10) Patent No.: US 9,743,636 B1
(45) Date of Patent: Aug. 29, 2017

(54) SYSTEM AND METHOD FOR REMOTELY MANAGING AMBIENT CONDITIONS SUCH AS ATMOSPHERIC AMMONIA CONCENTRATIONS IN ANIMAL HOUSINGS

(71) Applicant: Cell Sign International, Inc., Manchester, TN (US)

(72) Inventors: Eric Casebolt, Manchester, TN (US); Dennis William Dormady, Jacksonville, FL (US); Stephen M. Obsharsky, Jacksonville, FL (US)

(73) Assignee: Cell Sign International, Inc., Manchester, TN (US)

( * ) Notice: Subject to any disclaimer, the term of this patent is extended or adjusted under 35 U.S.C. 154(b) by 147 days.

(21) Appl. No.: 14/946,277

(22) Filed: Nov. 19, 2015

Related U.S. Application Data

(60) Provisional application No. 62/129,057, filed on Mar. 6, 2015.

(51) Int. Cl.
*A01K 1/00* (2006.01)
*G08B 21/14* (2006.01)
*A01K 29/00* (2006.01)

(52) U.S. Cl.
CPC .......... *A01K 1/0047* (2013.01); *A01K 29/005* (2013.01); *G08B 21/14* (2013.01)

(58) Field of Classification Search
CPC ..... A01K 1/0047; A01K 29/005; G08B 21/14
See application file for complete search history.

(56) References Cited

U.S. PATENT DOCUMENTS

| | | | |
|---|---|---|---|
| 5,467,922 A | 11/1995 | Carey et al. | |
| 6,608,491 B2 | 8/2003 | Salmon, Jr. | |
| 6,998,980 B2 | 2/2006 | Ingley, III et al. | |
| 8,297,231 B2 * | 10/2012 | Yanai | G06F 19/3418 119/174 |
| 8,471,707 B2 * | 6/2013 | Frohlick | G01D 21/00 340/572.1 |
| 8,830,068 B2 | 9/2014 | Campbell et al. | |
| 9,373,243 B2 * | 6/2016 | Martin | G08B 21/182 |

(Continued)

FOREIGN PATENT DOCUMENTS

CN 101900716 12/2010
WO 2014118788 A2 8/2014

*Primary Examiner* — Brian Zimmerman
*Assistant Examiner* — Sara Samson
(74) *Attorney, Agent, or Firm* — Patterson Intellectual Property Law, P.C.; Gary L. Montle

(57) ABSTRACT

A system and method for remotely managing gas concentrations in gas-sensitive facilities comprises a computer system communicatively connected to one or more atmospheric sensors and ventilation systems. When a sensor reports that a predetermined threshold for a measured atmospheric condition has been exceeded, such as for atmospheric concentrations of ammonia, the computer system generates an alert and forwards the alert across a wireless communications network to a user's mobile device. The user may select a user command to send to the computer system, whereupon the computer system may activate one or more ventilation systems in accordance with the response action or alternatively override the user command based upon one or more contextual determinations, the ventilation systems able to reduce the atmospheric condition to optimal, sub-threshold levels.

18 Claims, 6 Drawing Sheets

(56) References Cited

U.S. PATENT DOCUMENTS

| | | |
|---|---|---|
| 2010/0282184 A1 | 11/2010 | Larson |
| 2012/0229277 A1 | 9/2012 | Gabriel et al. |
| 2014/0252099 A1* | 9/2014 | Hatton ...................... F24F 7/06 236/44 A |
| 2014/0311350 A1* | 10/2014 | Campbell .......... G01N 21/7703 96/417 |
| 2016/0120144 A1* | 5/2016 | Kim ..................... A01K 1/0047 119/437 |

* cited by examiner

SYSTEM AND METHOD FOR REMOTELY MANAGING AMBIENT CONDITIONS SUCH AS ATMOSPHERIC AMMONIA CONCENTRATIONS IN ANIMAL HOUSINGS

CROSS-REFERENCES TO RELATED APPLICATIONS

This application claims benefit of U.S. Provisional Patent Application No. 62/129,057, dated Mar. 6, 2015, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE DISCLOSURE

The present disclosure relates generally to improving processes in the field of ambient condition management. More particularly, the present disclosure relates to monitoring and decision support with respect to atmospheric ammonia concentrations in ammonia-critical operations.

Farm animal housing, such as poultry houses, are prone to collect pollutants like dust, pathogens, microorganisms, and gases such as ammonia, hydrogen sulfide, carbon dioxide, carbon monoxide, nitrous oxide, and methane. These pollutants can accumulate in quantities that become noxious and deleterious to the health of livestock.

Additionally, environments such as oil and gas fields may experience high levels of gaseous pollutants and/or toxins. These pollutants can accumulate in quantities that become dangerous for human beings.

Atmospheric ammonia is a known major aerial pollutant for poultry houses. Ammonia release is caused by the interaction of fecal content of litter, moisture, and temperature. Several studies have shown that ammonia can reduce bird growth performance, increase susceptibility to diseases, and increase subsequent mortality. Therefore, poultry farmers often struggle with determining how best to design a poultry house in a manner that will prevent ammonia accumulation without compromising adequate shelter for the poultry. Currently, farmers typically rely on passive or active ventilation to mitigate atmospheric ammonia. However, these ventilation systems lack proper feedback mechanisms and risk exchanging air too frequently or not enough, risking a reduction in fertilizer value due to unnecessary ammonia loss or risking a reduction in poultry health due to unnecessary ammonia buildup.

Automated fans may vent excess ammonia only as needed, but these systems typically do not provide farmers with appropriate feedback mechanisms regarding when, or even whether, the ventilation system should engage. For farmers to engage in ammonia monitoring, they currently must be on site at the poultry house, which takes extra time and may result in a delay wherein unwanted levels of atmospheric ammonia may go unnoticed.

Further, as ammonia is a noxious gas for humans and can adversely affect other industrial processes when present in abundant quantities, it may be desirable to apply these gas ventilation technologies to other industrial fields where workers or materials sensitive to the presence of ammonia may be present. For example, ammonia monitoring and ventilation may be advantageous to oil and gas production, agricultural farming, and refrigeration systems where ammonia management may affect physical health or product performance. Even in applications that are outdoors, automatic ventilation may be desirable to prevent dangerous ambient levels of pollutants. When ventilation control may not be readily available, the subject matter of the present disclosure may still be very useful to indicate ambient levels of pollutants.

Therefore, what is needed is a system for monitoring gas conditions that will remotely notify the user via wireless communications channels of potentially problematic conditions, provide the user with certain response options, determine the user's selected response, and execute the user's response accordingly. The system may be an automated ventilation system in some embodiments. Over ninety-five percent of farmers carry cellular devices or have an Internet-connected computer system. As such, an automated ventilation system of this type would provide farmers a low-cost method to manage atmospheric ammonia and other concentrations of pollutant gases in their livestock facilities, thereby increasing the health and subsequent yield of livestock.

A gas concentration management system may be further desirable in the field of absorption and vapor-compression refrigeration where ammonia serves as a coolant. As refrigeration systems must manage the content of ammonia in order to effect proper cooling, an automated gas management system can be used to effectively notify a user of gas concentrations that deviate from an optimal range and peremptorily or automatically adjust gas concentrations by activating or deactivating ventilation systems to release or stop the release of pressurized anhydrous ammonia, respectively.

BRIEF SUMMARY OF THE DISCLOSURE

In accordance with a particular aspect of the present disclosure, a computer system operatively connected to one or more ventilation systems in a facility is further communicatively connected to one or more ammonia detection sensors capable of determining a level of ammonia within the facility. When the atmospheric ammonia level exceeds a certain threshold as stored upon the computer system, the computer system will generate an alert and send said alert via a modem and across a communications network to a user's wireless computing device. The user may respond to the alert via the wireless computing device and send instructions to the computer system for engaging one or more of the ventilation systems. Upon receipt of wirelessly transmitted instructions, the server may engage the ventilation systems as per the instructions received.

In one embodiment of the disclosure, a system for remotely managing one or more gas levels in a facility includes one or more ventilation systems. The ventilation systems may be configured to move or exchange one or more gases within the facility with one or more gases external the facility. The system may also include a sensor system inside the facility. The sensor system may include at least one gas sensor. The ventilation system and sensor system may be communicatively connected to a controller to direct the performance of operations. The operations performed may include monitoring a concentration of one or more gases within the facility via the one or more gas sensors; comparing the monitored concentration of gas to a predetermined gas concentration threshold; generating and forwarding an alert by means of a wireless communications network to a user's mobile device when the monitored concentrations of gas are in excess of the predetermined gas concentration threshold; monitoring for a user command received from the user's mobile device via the wireless communications network; determining associated instructions to be executed for a user command; determining one or more ambient condition profiles from at least the concentration of the gases within the facility, the ambient condition profile(s) including one or more associated invalid commands; comparing the user command to the one or more invalid commands of the one or more determined ambient condition profiles; rejecting the response action associated with the user command and not executing the associated instructions if the user command matches one or more invalid commands; and accepting the user command and executing the associated instructions to activate the one or more ventilation systems if the user command does not match one or more invalid commands.

Another embodiment may include the sensor system including at least one sensor apparatus. The at least one sensor apparatus may include a housing. The housing may include an intake end, an exhaust end opposite the intake end, and an axial passageway defined in the housing and extending from the intake end to the exhaust end. The sensor apparatus may also include a sensor positioned in the axial passageway and at least one electrical component positioned in the axial passageway nearer the exhaust end than the sensor. The at least one electrical component may be configured to create a temperature differential between the intake end and the exhaust end such that air drafts past the sensor.

Yet another embodiment may include the sensor further including one or more display portions effective to display alphanumeric messages. The display portion(s) may be disposed on the outside of the housing.

Still another embodiment may include the temperature differential being due to waste heat created by the at least one electrical component.

A further embodiment may include the sensor apparatus further including at least one filter covering at least a portion of the axial passageway.

Another embodiment may include the sensor apparatus further including a fan disposed in the axial passageway to further cause air to draft past the sensor.

A further still embodiment may include the sensor system further including a temperature sensor. The ventilation system may include one or more components, such as a fan, a heating element, and a refrigeration system.

One embodiment includes the controller further directing the performance of operations including monitoring a temperature within the facility via the temperature sensor; comparing the monitored temperature to one or more predetermined temperature thresholds; and generating and forwarding an alert by means of the wireless communications network to the user's mobile device for monitored temperatures in excess of one or more temperature thresholds.

Another embodiment includes the controller further directing the performance of operations including maintaining an activated state of the one or more ventilation systems for the duration the threshold is exceeded, and temporarily disabling one or more of the ventilation systems when the threshold is no longer exceeded.

Yet another embodiment includes a plurality of devices. Each device may include a local communications module functionally linked to a local network. A first device may include a master device and the remaining one or more of the plurality of devices may include slave devices. The slave devices may be effective to send data to the master device via the local network. The first device may further include a remote communications module functionally linked to the user's mobile device via the wireless communications network and the controller operatively linked to the at least one gas sensor and the local and remote communications module. The controller may be effective to receive a predetermined gas concentration threshold data string transmitted from the user's mobile device via the wireless communications network, generate a return data string based on gas levels data sensed by the at least one gas sensor, and transmit the return data string across the wireless communications network via the remote communications module to the user's mobile device.

Still another embodiment includes the master device including one or more display portions effective to display alphanumeric messages based on the gas levels data sensed by the at least one gas sensor.

An embodiment includes the controller of the master device being further effective to transmit data via the local network to each of the slave devices and the slave devices being further effective to exchange data with the master device via the local area network.

In another embodiment, the system further includes a plurality of devices. Each device includes a remote communications module functionally linked to the user's mobile device via the wireless communications network, and a controller operatively linked to the at least one gas sensor and the remote communications module. The controller may be effective to receive a predetermined gas concentration threshold data string transmitted from the user's mobile device via the wireless communications network, generate a return data string based on gas levels data sensed by the at least one gas sensor, and transmit the return data string across the wireless communications network via the remote communications module to the user's mobile device.

Another embodiment includes each device further including one or more display portions effective to display alphanumeric messages based on the gas levels data sensed by the at least one gas sensor.

One embodiment may include an integrated display module that can stream video from remote sources such as cameras mounted apart from the devices and/or one or any combination of the master and slave devices. The integrated display module may be one or more of a user's cell phone, a smart television, and the like.

In an embodiment, the present disclosure also relates to a method including monitoring a concentration of gas within a facility via one or more gas sensors, comparing the monitored concentration of gas to a predetermined gas concentration threshold, generating and forwarding an alert by means of a wireless communications network to a user's mobile device for monitored concentrations of gas in excess of the predetermined gas concentration threshold, monitoring a user command received from the user's mobile device via the wireless communications network, determining associated instructions to be executed for the user command, and executing the associated instructions to activate or deactivate one or more ventilation systems.

In another embodiment, the method further includes monitoring a temperature within the facility via a temperature sensor; comparing the monitored temperature to one or more predetermined temperature thresholds, and generating and forwarding an alert by means of a wireless communications network to a user's mobile device for monitored temperatures in excess of the one or more temperature thresholds.

Yet another embodiment of the method includes maintaining an activated state of the one or more ventilation systems for a duration the threshold is exceeded, and temporarily disabling one or more of the ventilation systems when the threshold is no longer exceeded.

A further embodiment of the method includes the wireless communications network including at least a cellular communications network. A user may connect to the cellular communications network with the user's mobile cellular unit, such as a smartphone, or a computer connected to a cellular modem. Thus, the user may receive the sensor outputs from the many devices monitoring the pollutant levels and control the system remotely. In one embodiment, a user may be watching television in his or her home, and the notifications from the sensor system may pop up on the television during a television show. A user may choose an action for the system with the television's remote control. Alternatively, the mobile display unit may be a screen integrated into a user's RV, boat, car, and the like. Instead of a visual alert, a user may receive a voice message alert on his or her mobile device. Also, the user may optionally speak a response command into his or her phone instead of selecting a response command on a screen.

Still another embodiment of the method further includes determining one or more ambient condition profiles from at least the concentration of gas, the ambient condition profile comprising one or more associated invalid commands; comparing the user command to the one or more invalid commands of the one or more determined ambient condition profiles; rejecting the user command and not executing the associated instructions if the user command matches one or more invalid commands; and accepting the user command and executing the associated instructions to activate the one or more ventilation systems if the user command does not match one or more invalid commands.

In another embodiment, the present disclosure relates to a system for remotely managing one or more gas levels in a facility. The system may include one or more ventilation systems configured to move or exchange one or more gases within the facility with one or more gases external the facility, a sensor system disposed in the facility including at least one gas sensor, and the ventilation system and sensor system communicatively connected to a controller to direct performance of operations. The operations may include monitoring a concentration of one or more gases within the facility via the at least one gas sensor; comparing the monitored concentration of gas to a predetermined gas concentration threshold; generating and forwarding an alert by means of a wireless communications network to a user's mobile device for monitored concentrations of gas in excess of the predetermined gas concentration threshold, wherein the wireless communications network includes at least a cellular communications network; monitoring for a user command received from the user's mobile device via the wireless communications network; determining associated instructions to be executed for the user command; and executing the associated instructions to activate the one or more ventilation systems.

In a further embodiment, the sensor network may be applied to outdoor environments, such as an oil and/or gas field, which may be prone to high levels of pollutants.

DETAILED DESCRIPTION OF THE DISCLOSURE

Figure 1:
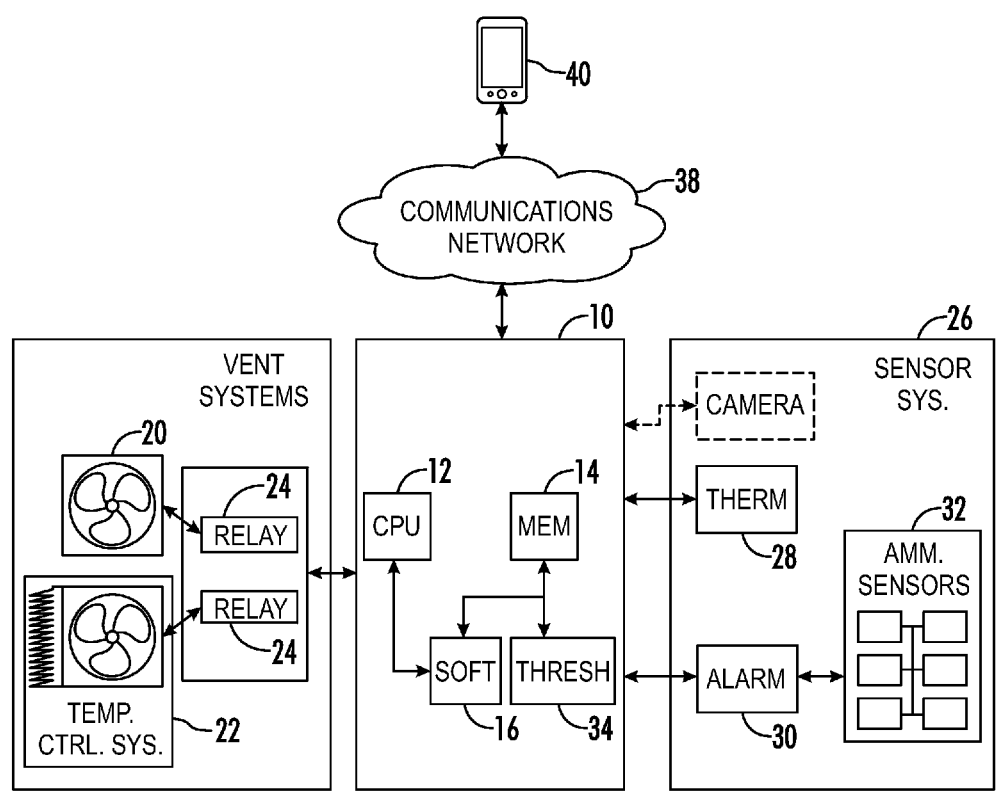
FIG. 1 is a block diagram representing an embodiment of a ventilation and monitoring system in accordance with the present disclosure.
Figure 2:
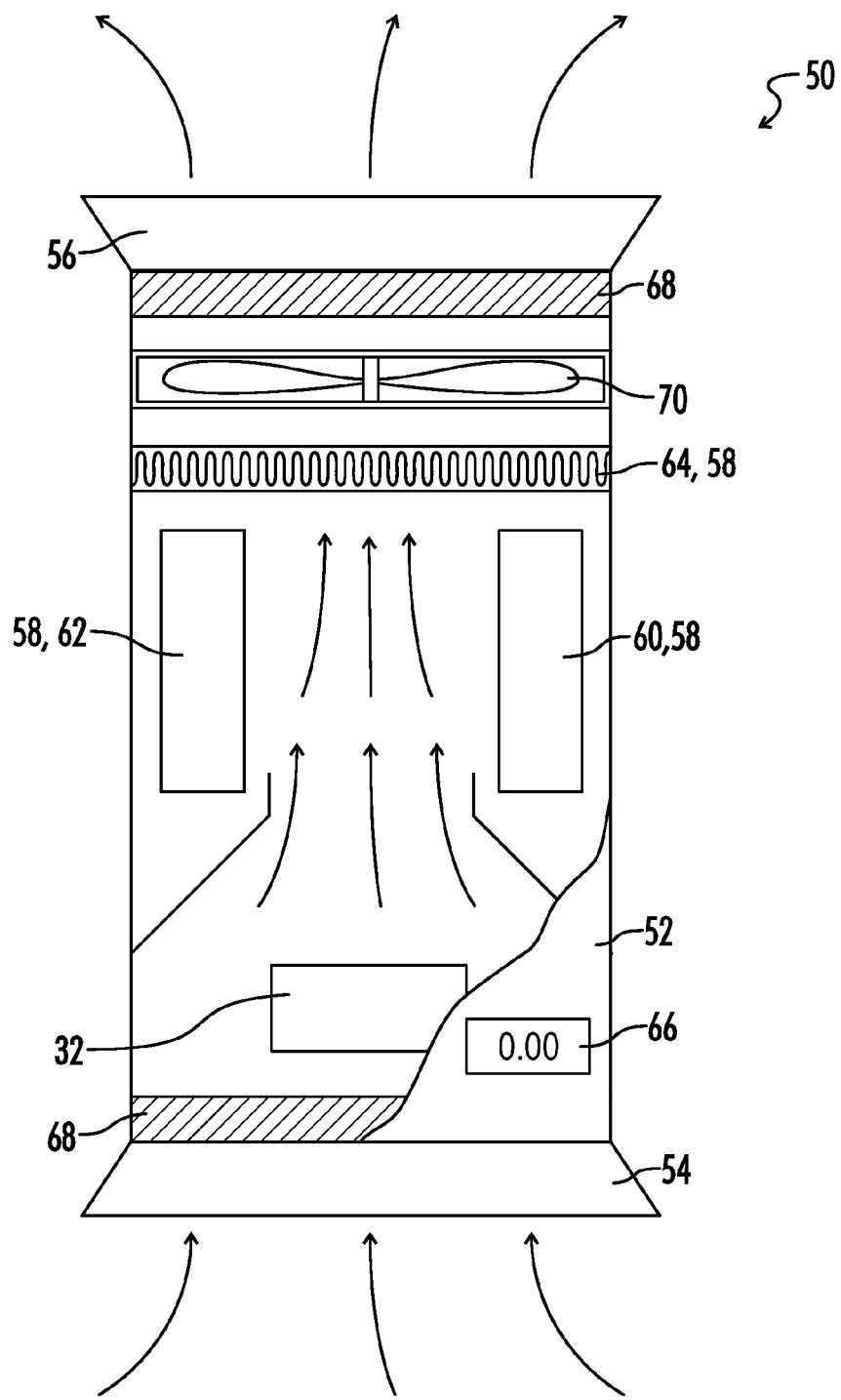
FIG. 2 is a cross-sectional view of an embodiment of a sensor apparatus to be used with the ventilation and monitoring system of FIG. 1.

Referring generally to FIGS. 1-7, various exemplary embodiments of an invention may now be described in detail. Where the various figures may describe embodiments sharing various common elements and features with other embodiments, similar elements and features are given the same reference numerals and redundant description thereof may be omitted below. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "user interface" as used herein may unless otherwise stated include any input-output module with respect to the hosted server including but not limited to web portals, such as individual web pages or those collectively defining a hosted website, mobile device applications, telephony interfaces such as interactive voice response (IVR), and the like. Such interfaces may in a broader sense include pop-ups or links to third party websites for the purpose of further accessing and/or integrating associated materials, data or program functions via the hosted system and in accordance with methods of the present disclosure.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

The term "facility" as used herein, unless otherwise stated, means any building, structure, bounded area, place, container, tank, and the like, where one or more gasses may be substantially contained in one area substantially separate from one or more gasses of another area, and where gases may be exchangeable between the first and second areas.

The term "gas" as used herein, unless otherwise stated, means any combination of one or more chemical substances that may be gaseous at room temperature. Certain gases that are liquid under pressure or at colder temperatures may be present in their liquid form under pressure or at a colder temperature in this disclosure and are specifically contemplated by the term "gas."

The terms "atmosphere" and "atmospheric" as used herein may, unless otherwise stated, means one or more gases within a particular area and relating to such one or more gases within a particular area, respectively. The term "atmosphere" may include: one or more gases, a combination of breathable gases, air, and a solution of one or more gases in a liquid medium.

The terms "fan" and "ventilation fan" interchangeably mean, unless otherwise stated, any mechanical system capable of exchanging a gas from a first area to a second area. The terms may refer to either or both positive pressure ventilation systems and negative pressure ventilation systems. The terms may include power fans, air pumps, mechanical bladders, air control valves, solenoid valves, and the like.

FIG. 1 is an embodiment of a ventilation and monitoring system in accordance with the present disclosure. An exemplary computer system 10 may include a central processing unit 12 and a memory medium 14 with one or more program modules 16 stored thereupon, and serves as a control system for one or more ventilation and monitoring systems deployed in a facility. In an embodiment, the computer system 10 may be operatively connected to ventilation system devices including a ventilation fan 20 and a temperature control system 22 by means of one or more relays 24. The temperature control system 22 may be embodied as a heating element; a cooling element; a standalone heating, ventilation, and air conditioning (HVAC) unit; or other configuration effective to change the temperature of an internal air space of the facility.

The computer system 10 may further be operatively connected to one or more sensor systems 26, including for example an air temperature thermometer 28 and an alarm system 30. The one or more sensor systems 26 may be connected to the computer system by wired or wireless communications means. Other sensor systems may be contemplated for the measurement of other gases or atmospheric agents. For example, other sensor systems may be used to measure for gases or air pollutants that could result in harmful effects to livestock, animals, products, or functions within the facility, such as: carbon monoxide detection; smoke detection; agricultural chemical detection; oxygen detection; and the like. Still further sensor systems may include digital photography or videography equipment such as a web camera capable of capturing digital video or picture feed of the facility.

In some embodiments, the sensor system 26 may include at least one sensor apparatus 50. As can best be seen in FIG. 2, the sensor apparatus 50 may include a housing 52. The housing 52 may include an intake end 54 and an exhaust end 56 with an axial passageway defined in the housing and extending from the intake end to the exhaust end. The axial passageway may have a constant cross-sectional area or may be of a varying cross-sectional area. A sensor 32 may be positioned in the axial passageway inside the housing 52. At least one electrical component 58 may be positioned in the axial passageway inside the housing 52 between the exhaust end 56 and the sensor 32. The electrical component 58 may be of any type including, but not limited to, a controller 60, a power converter 62, a heating element 64, and the like. The electrical component 58 may be configured to create a temperature differential in the axial passageway between the intake end 54 and the exhaust end 56 such that air drafts into the intake end, past the sensor 32, and out of the exhaust end. The sensor apparatus 50 may further include one or more display portions 66 effective to display alphanumeric messages. The display portion 66 may, in non-limiting examples, be fastened to the housing 52, recessed in the housing, and the like. In embodiments using electrical components 58 such as a controller 60 or a power converter 62, the temperature differential may be due to waste heat created by at least one of the components. The sensor apparatus 50 may also include at least one filter 68 covering at least a portion of the axial passageway. A filter 68 may be placed over the intake end 54, exhaust end 56, or both. Also, the filter 68 may be located within the housing 52 along the axial passageway. A further embodiment may also include the sensor apparatus 50 including a fan 70 disposed in the axial passageway to further cause air to draft past the sensor 32. The fan may be located at the intake end 54, the exhaust end 56, or somewhere else along the axial passageway within the housing 52.

Figure 3:
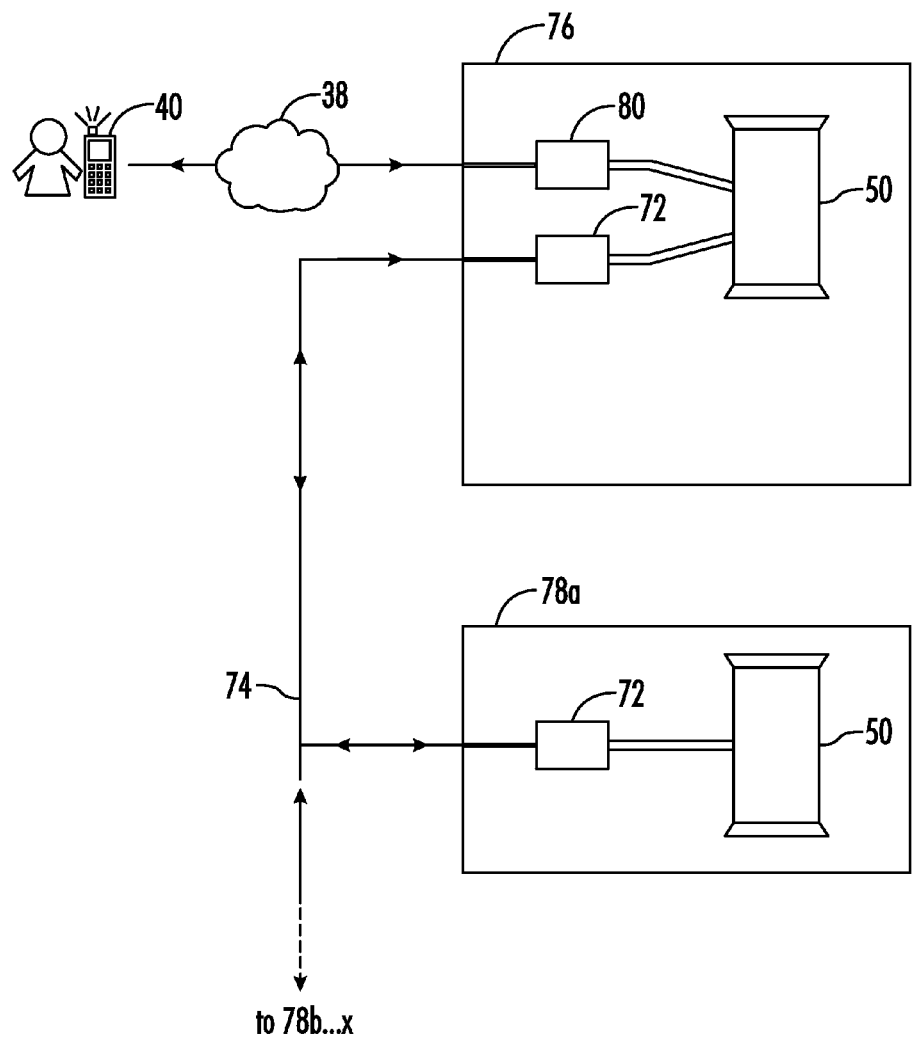
FIG. 3 is a block diagram representing an embodiment of the sensor system of FIG. 1.

Referring now to FIG. 3, some embodiments may include a plurality of sensor apparatuses 50. Each sensor apparatus 50 may include a local communications module 72 functionally linked to a local network 74. The local communications modules 72 may be linked to the local network 74 by any means including, but not limited to, both wired and wireless data transmission lines. Of the plurality of sensor apparatuses 50, at least one sensor apparatus may be a master sensor apparatus 76. The remaining sensor apparatuses 50 may be slave sensor apparatuses 78. The slaves 78 may be configured to send data to the master 76 via the local network 74. The master 76 may include a remote communications module 80 functionally linked to the user's mobile device 40 via the wireless communications network 38. The master may also include the controller 60 operatively linked to the at least one gas sensor 32 and the local communications module 72 and remote communications module 80. The controller 60 may be configured to receive a predetermined gas concentration threshold data string transmitted from the user's mobile device 40 via the wireless communications network 38, generate a return data string based on gas levels sensed by the at least one gas sensor 32, and transmit the return data string across the wireless communications network via the remote communications module 80 to the user's mobile device. The master 76 may also be configured to transmit data via the local network 74 to each of the slaves 78. The slaves 78 may also be configured to exchange data with the master 76 via the local network 74.

Figure 4:
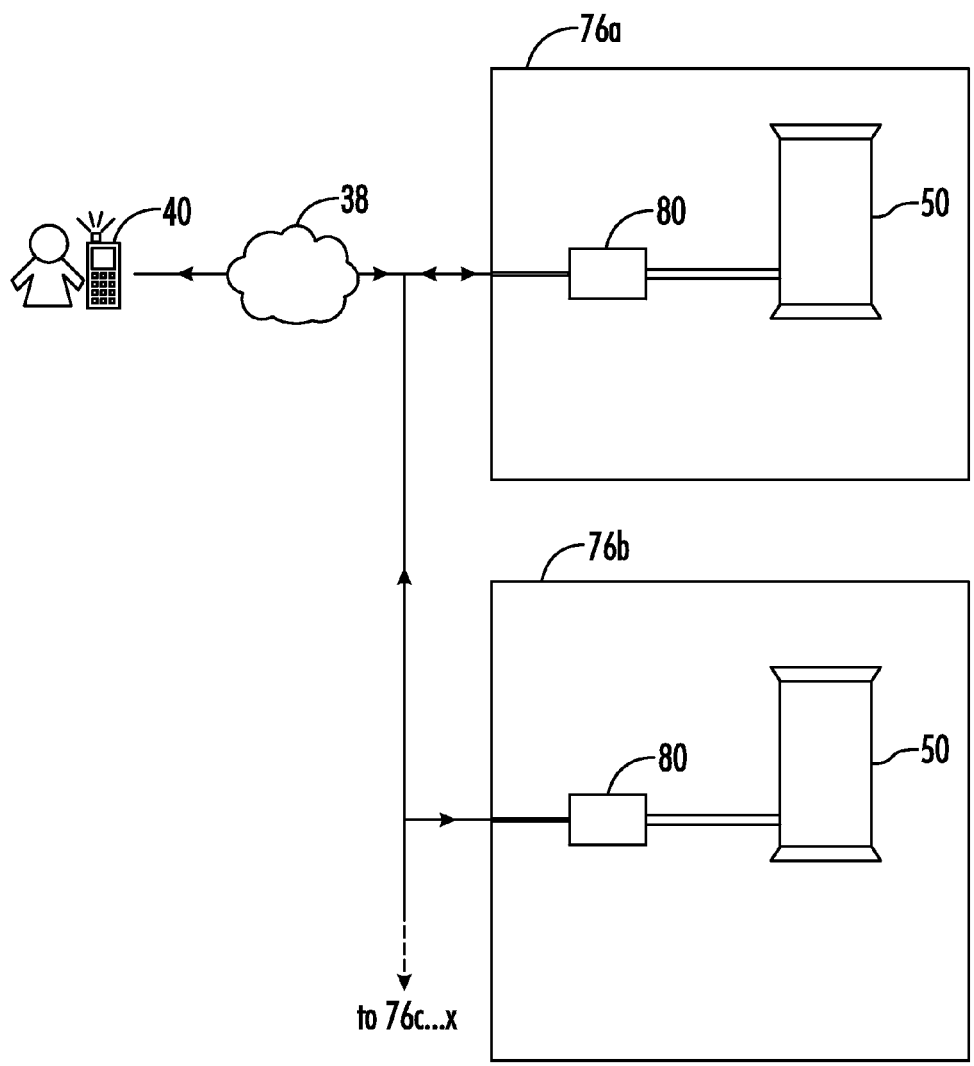
FIG. 4 is a block diagram representing another embodiment of the sensor system of FIG. 1.

As shown in FIG. 4, another embodiment may include each of the sensor apparatuses 50 configured in manner similar to the master 76 as discussed above so as to have a plurality of sensor apparatuses 50 that may operate and communicate with the user's mobile device 40 independently.

In certain embodiments, the one or more sensor systems 26 may be configured or capable to measure concentrations of gases or pollutants within non-atmospheric solutions such as liquids. For example, sensor systems may include ammonia concentration sensors for use in liquid refrigerant substances such as in absorption refrigeration systems.

The computer system 10 may optionally be operatively connected to one or more display devices, not depicted in FIG. 1, capable of displaying at least atmospheric conditions as determined by the one or more sensor systems. The display device may be further configured to display notifications and calibration settings.

The gas alarm system 30 may be comprised of one or more gas sensors 32 effective to determine the content of gas of the internal facility space. In certain embodiments, the gas sensors 32 may be wired, in series or in parallel, to allow deployment of the sensors across a broad geography of the facility. In alternative embodiments, the gas sensors 32 may be wireless such that each sensor wirelessly communicates with the alarm system control unit 30. In certain alternative embodiments, one or more sensors capable of detecting a broad spectrum of agents may be used rather than an array of specialized sensors. In an embodiment, the gas sensors 32 may be operatively connected directly to the computer system 10. In an alternative embodiment, the gas alarm system 30 may be contained within or be the same system as the computer system 10.

The computer system's CPU 12 may execute the software instructions 16 stored upon the memory medium 14 to direct the performance of monitoring atmospheric conditions of the facility via the sensors. In a preferred embodiment, one or more atmospheric thresholds 34 may be stored upon the memory medium 14 of the computer system 10. The atmospheric thresholds 34 may relate to atmospheric conditions within the facility as determinable by the sensor systems 26. For example, atmospheric thresholds may exist for atmospheric concentrations of gas as measured by parts-per-million (PPM) of gas to atmosphere, and temperature thresholds may exist for atmospheric temperature as measured by degrees Fahrenheit, Celsius, or Kelvin.

In certain embodiments, thresholds may exist for other atmospheric conditions dependent upon the configuration and type of sensors attached. For example, a maximum threshold may exist for carbon monoxide where a carbon monoxide detector is one of the communicatively coupled sensor devices 26. Thresholds may exist as minimum or maximum floors or ceilings, and multiple thresholds may exist for a single measurement; for example, for the determination of temperature, a minimum threshold may be set at 55 degrees Fahrenheit, and a maximum threshold may be set at 95 degrees Fahrenheit. Thresholds may be set to levels associated with ranges of health-positive environmental factors, such that environmental factors that exceed a maximum or minimum threshold are indicative of an environment that may be detrimental to the health or performance. In certain embodiments, thresholds may be configured to ranges deemed optimal for maintaining the health and safety of livestock or animals within an animal housing facility. The thresholds may be predetermined or may alternatively be specified by the user.

The computer system 10 may be further configured to generate an alert when one or more sensor systems 26 indicate an atmospheric condition at or in excess of a stored threshold 34. In one embodiment, the computer system 10 may be operatively connected to a communications modem 36 capable of connecting the computer system 10 to a communications network 38. When an alert is generated, the computer system 10 may send the alert via the communications network 38 to a wireless user mobile device 40. In a preferred embodiment, the computer system 10 may generate an SMS message subsequently delivered to a user's cell phone 40. However, other notification formats may be used, such as push notification, radio transmission, e-mail, phone call, and the like.

In certain embodiments, the computer system 10 may aggregate preferred responses in accordance with the software instructions 16 to incorporate into or send tangential to the alert. For example, for an alert associated with the atmospheric gas content having exceeded the threshold value of 25 PPM, the computer system 10 may determine via the software instructions 16 that the current detected value of gas at 28 PPM is associated with a preferred response of engaging the ventilation fan 20 at a certain speed for a defined period of time. The computer system 10 may, in addition to sending an alert to the user's mobile device 40 that the atmospheric gas currently exceeds the specified threshold, suggest one or more of the preferred responses for user selection. The user may then respond via the mobile device 40 to the computer system 10 by selecting one of the preferred responses and transmitting the response across the communications network 38 back to the computer system 10.

In an embodiment, the user may reply to the initial SMS message with a numeric code associated with a preferred response. Upon receipt of the response, the system may perform upon the response in accordance with the software instructions 16. Continuing the aforementioned example, the computer system 10 may send an alert that the atmospheric content of gas is 28 PPM and is 3 PPM in excess of the threshold value. The system may also send a recommended action of engaging the ventilation fan 20 for 30 minutes at medium speed. The user may select upon his mobile device 40 to either take no action, to engage in the recommended action, or to take a different user-specified action, each action associated with a certain response code, keyword, or phrase to be transmitted back to the system. For example, if the aforementioned examples are numbered 1, 2, and 3 respectively, the user may send an SMS message reply with the content of "2," and the computer system 10 will engage software instructions 16 effective to engage the fan 20 via the one or more relays 24.

In another embodiment, the computer system 10 and software instructions 16 may be configured to receive a command from the user's mobile device 40 irrespective of the generation of an alert. A command may be embodied as a code, phrase, programming string, or other form of communication transmissible across the communications network 36 and capable of uniquely identifying one of a plurality of executable activities. Such activities may include, but are not limited to; retrieving and replying with information pertaining to one or more of the associated ventilation systems; retrieving and replying with information collected from the one or more sensor systems 26; activating one or more of the associated ventilation systems; deactivating one or more of the associated ventilation systems; activating one or more of the associated ventilation systems in accordance with specific parameters; activating one or more of the associated sensor systems 26; deactivating one or more of the associated sensor systems 26; activating one more of the associated sensor systems 26 in accordance with specific parameters; and adding, removing, or changing alert threshold values.

In a further embodiment, the computer system 10 may determine whether or not to execute a received command in accordance with parameters specified in the software instructions 16. The computer system 10 and software instructions 16 may refuse to execute a command where the sensor systems 26 indicate an ambient state or condition or where the one or more relays 24 of the associated ventilation systems are set to a certain configuration. To posit several examples: the computer system 10 may refuse to execute a command to activate the fan 20 where the fan is already activated; the computer system 10 may refuse to execute a command to deactivate the air conditioner 22 when the air temperature thermometer 28 indicates an air temperature greater than a maximum threshold; the computer system 10 may refuse to execute a command to activate the heater 22 when the air temperature thermometer 28 indicates an air temperature greater than a maximum threshold; and the like.

The software instructions 16 may preferably be configured to identify a plurality of conditions where commands may be improper, superfluous, or detrimental to the system, occupants, and/or product and subsequently reject those commands wherein the computer system 10 conditions have been met. Upon refusing a received command, the computer system 10 may generate an alert to send to the user's mobile device 40 to notify the user that the command has been refused. The alert may preferably include information pertaining to why the command has been refused, such as indicating the state of a ventilation system or ambient condition of the facility as monitored by the sensor systems 26.

Other alerts and responses may be associated with different ventilation systems. For example, an alert may be generated for the ambient temperature exceeding a threshold, whereupon the user may select a response of engaging the air conditioning system until a normal temperature is achieved. In certain embodiments, a user may be able to select actions via a user interface upon the mobile device, the user interface generated by means of a mobile application or secure website. In other embodiments, the user may be able to send API commands via the communications network 38 to define which ventilation systems should be engaged and according to which parameters.

In still other embodiments, the computer system 10 may proactively engage upon one or more recommended actions automatically and without user selection. For example, where a gas threshold has been exceeded, the computer system 10 may automatically activate the fan 20 and notify the user that the fan has been activated. In a further embodiment, the user may be able to override the automatic determination and, in accordance with the example, turn off the fan.

Figure 5:
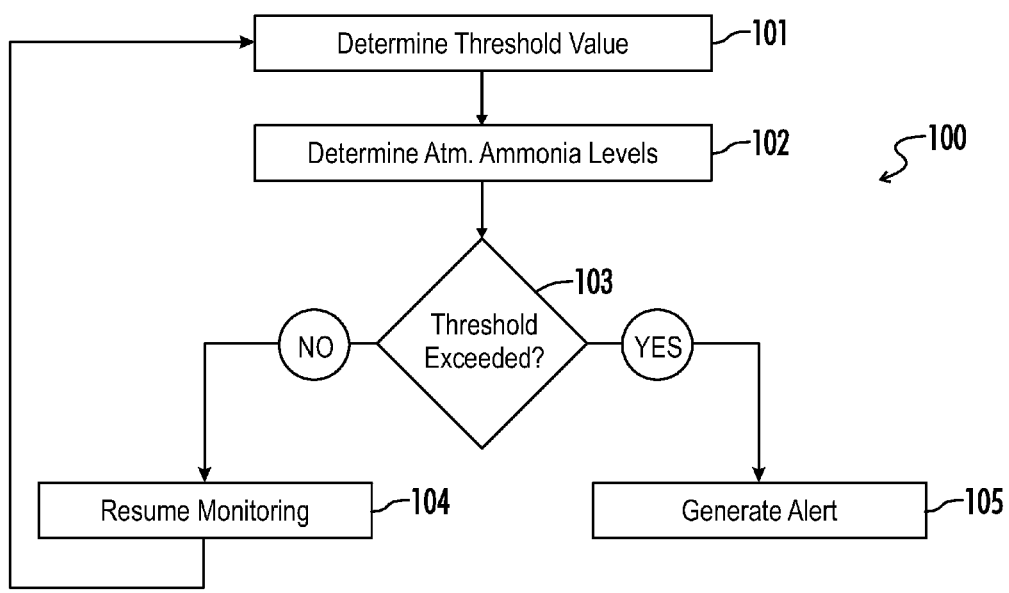
FIG. 5 is a flowchart representing an embodiment of a method for monitoring concentrations of gases in accordance with the present disclosure.

FIG. 5 is an embodiment of a method for monitoring concentrations of atmospheric gas in accordance with the present disclosure. The method 100 begins at step 101 when the computer system determines a threshold value for the maximum quantity of gas. The threshold value may be stored in memory and may be preconfigured or otherwise specified by a user. In step 102, the system determines the atmospheric content of gas by means of an atmospheric gas sensor, which detects the concentration of gas in the atmosphere around the sensor. In certain embodiments, multiple sensors may be used, whereupon the determination may be made for each of, a subset of, or all sensors in the sensor array.

In step 103, the system compares the atmospheric gas value to the threshold value. If the atmospheric value does not exceed the threshold value, then the system proceeds to step 104 and continues its monitoring state. The monitoring state, wherein method 100 is performed, may be continuous or periodic, such that steps 101-103 are performed either continuously or intermittently at scheduled intervals. If the atmospheric value exceeds the threshold value, then the system proceeds to step 105 and generates an alert. Upon generation of the alert, the system may resume its monitoring state and repeat method 100. In certain embodiments such as when the method is performed continuously, after an initial alert is generated, the system may implement a grace period before issuing subsequent alerts to allow for atmospheric values to normalize, thereby preventing a continuous flood of generated alerts for the duration that the threshold value is exceeded.

Method 100 may be similarly performed for other atmospheric factors as measured by other sensors with threshold values assigned to each. For example, separate alerts may be generated (S105) for determination that an atmospheric heat threshold has been exceeded, that an atmospheric cold threshold has been exceeded, that an atmospheric carbon monoxide threshold has been exceeded, that an atmospheric pollutant threshold has been exceeded, and so on.

Figure 6:
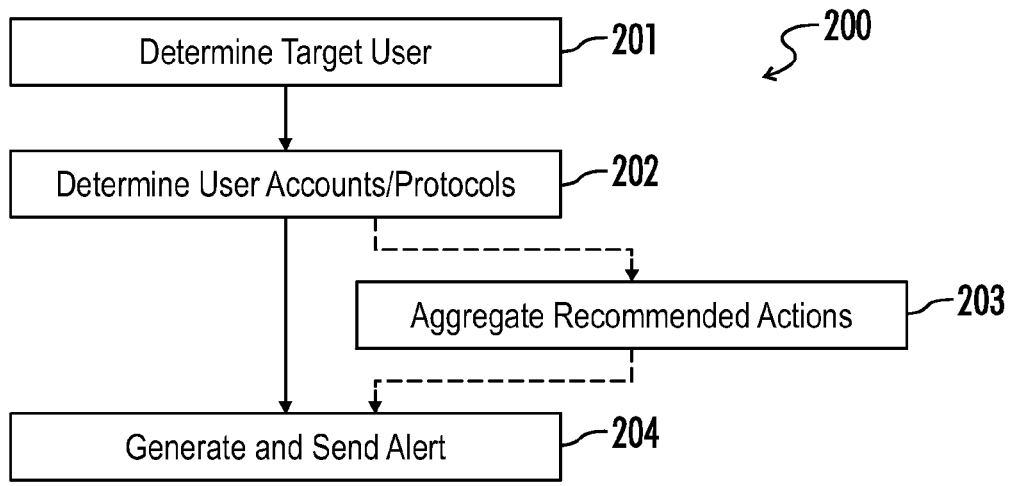
FIG. 6 is a flowchart representing an embodiment of a method for generating a wireless alert in accordance with the present disclosure.

FIG. 6 describes an embodiment of a method for generating an alert on a wirelessly connected device in accordance with this disclosure and the alert generation step described in FIG. 5. The method 200 begins at a first step 201 wherein the system determines a target user to receive said alert. In certain embodiments, more than one target user may be determined to receive an alert. In additional embodiments, a target user may be associated with one or more communications accounts. For example, a user may have an associated cell phone number, e-mail address, application user ID, and so forth. In step 202, the system then determines which target users and which target user accounts to select for receipt of the alert.

The system may also perform step 203, wherein the system aggregates one or more actions stored in association with the alert. For example, for an alert that atmospheric ammonia levels have been exceeded, the system may aggregate the options of: turn fans on low; turn fans on medium; turn fans on high; and do nothing. Alternatively, the system may aggregate the options of: turn fans on for 15 minutes; turn fans on for 30 minutes; turn fans on for 45 minutes; and do nothing.

In step 204, the system generates an alert and sends it to a mobile device associated with a target user by means of a communications network. In certain embodiments, multiple mobile devices associated with one or more target users may be selected for receipt. For example, an alert may be sent to one or more target users' cell phone numbers, e-mail addresses, messaging platforms, and the like. Alerts may take the form of an SMS message, MMS message, e-mail message, push notification, SMTP, instant message, and like forms of electronic communications. In certain embodiments, alerts may include a description of the threshold exceeded, the current atmospheric measure triggering the alert, the amount by which the threshold has been exceeded, and/or possible responses.

In preferred embodiments, the system may include with the alert, or alternatively send subsequent to the alert, the one or more aggregated actions determined in step 203 for user selection. In certain embodiments, the aggregated actions may include the display of a picture or video of the facility at the time of, or at a time immediately following, the generation of the alert. The system may alternatively automatically deliver the picture or video automatically with the alert. In an embodiment, the alert, conditions, picture, and/or video may be sent to multiple users. In said embodiment, the system may further enable the multiple users to monitor conditions and interact with one another such as through a chat room, voice conference call, and the like.

Figure 7:
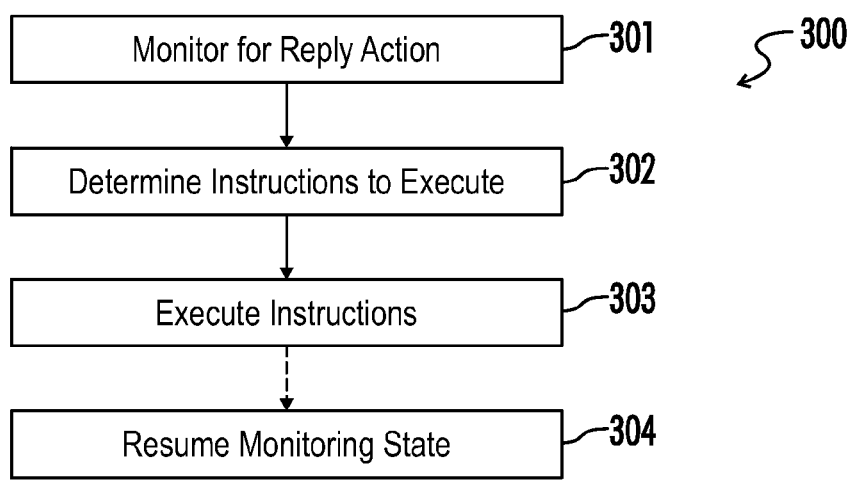
FIG. 7 is a flowchart representing an embodiment of a method for executing ventilation instructions in accordance with the present disclosure.

FIG. 7 is an embodiment of a method for executing ventilation instructions in accordance with the present disclosure and the wireless alert generation method described in FIG. 6. The method 300 begins at step 301 where the system monitors for a reply action from the target user following the generation and sending of an alert as described in the method embodied in FIG. 6. A reply may be sent wirelessly to the system in accordance with the same communications network protocol used to send the alert. For example, an SMS or MMS message may monitor for an SMS response from the cellular number messaged; an e-mail message may await a reply with certain body text; and so forth. The user may select a reply action from one of a plurality of proposed actions as determined in step 203. For specific example, where a target user has received the alert and proposed actions: "ALERT: ammonia levels in Coop 3 @ 32 PPM; +7 over 25 PPM; (1) engage fans for 30 minutes, (2) engage fans for 2 hours, (3) do nothing; reply with choice of action;" the target user may reply to the message with a body text of "1," "2," or "3," each number corresponding to each respective action proposed, such that "1" will engage the fan for 30 minutes, "2" will engage the fan for 2 hours, and "3" will not engage the fan. In certain embodiments and in reference to FIG. 6, the user may define a reply action not determined in step 203 by means of an API function. For example, a response of: "fan:all,spd:50,dur: 30" in the message reply body may result in turning on all ventilation fans at 50 percent speed for a duration of 30 minutes.

Upon receiving the target user's reply action, the system proceeds to step 302 and determines executable instructions associated with the reply action. In preferred embodiments, the executable instructions may be electronic impulses or signals sent to certain switches, relays, or computer inputs of attached ventilation systems for purposes of activating or deactivating said ventilation systems. For example, a received reply action may be associated with instructions effective to turn on certain ventilation fans, heating elements, cooling elements, and the like. Alternatively, associated instructions may not activate ventilation systems and may instruct the system not to generate and/or alerts for a certain period of time. In certain embodiments, instructions may also or independently affect the turning on of a video or camera system within or facing the facility and the subsequent capture of video or images from said camera.

In an alternative embodiment of step 302, the system may compare the reply action with preconfigured parameters and determine from the comparison whether to execute the instructions in accordance with step 303 or to refuse to execute the instructions. The preconfigured parameters may specify not to execute certain reply actions when certain states and/or conditions are present. Conditions may include ambient conditions as determined by associated sensors; operating states of the ventilation systems; non-ambient conditions determined from non-sensor sources, such as for example time of day determined from the computer system or local weather determined from a communications network-based source; and the like. For example, in an embodiment contemplating refrigeration, a user may send instructions to decrease the temperature in the refrigeration storage space by 4 degrees Fahrenheit; the system may compare this command with preconfigured parameters, determine that the amount of ammonia necessary to be transferred into the refrigerant to achieve that temperature difference would exceed the recommended mechanical threshold for ammonia concentrate within the refrigerant, and refuse to execute the command or, alternatively, execute an alternative command such as lowering the storage space by 2.5 degrees Fahrenheit, In the event of a refusal, the system may optionally send an alert to the target user.

In step 303, the system executes the determined instructions associated with the user's reply action. In an exemplary embodiment, a reply action associated with instructions to enable a ventilation system may affect output to a relay that activates one or more ventilation fans in the facility for a determined duration of time and then after such duration may affect a second output to said relay that deactivates the one or more ventilation fans previously activated. In a second exemplary embodiment, the system may activate one or more ventilation fans until the atmospheric gas has fallen underneath a certain threshold as determined by the one or more atmospheric gas detectors. In other exemplary embodiments, reply actions may include the taking and sending of a photograph or video of the facility to the user; activating a heating element until a threshold temperature is achieved; activating a heating element until a threshold temperature is achieved; and so forth. The system may, subsequent to the execution of instructions, optionally resume monitoring atmospheric conditions in step 304 as per method 100 embodied in FIG. 5 above.

The previous detailed description has been provided for the purposes of illustration and description. Thus, although there have been described particular embodiments of the present disclosure of a new and useful invention, it is not intended that such references be construed as limitations upon the scope of this invention except as set forth in the following claims.

What is claimed is:

1. A system for remotely managing one or more gas levels in a facility, the system comprising:
    one or more ventilation systems configured to move or exchange one or more gases within the facility with one or more gases external the facility;
    a sensor system disposed in the facility comprising at least one gas sensor;
    the ventilation system and sensor system communicatively connected to a controller to direct performance of operations comprising:
        monitoring a concentration of one or more gases within the facility via the one or more gas sensors;
        comparing the monitored concentration of gas to a predetermined gas concentration threshold;
        for monitored concentrations of gas in excess of the predetermined gas concentration threshold, generating and forwarding an alert by means of a wireless communications network to a user's mobile device;
        monitoring for a user command received from the user's mobile device via the wireless communications network;
        for the user command, determining associated instructions to be executed;
        determining one or more ambient condition profiles from at least the concentration of the gases within the facility, the ambient condition profile comprising one or more associated invalid commands;
        comparing the user command to the one or more invalid commands of the one or more determined ambient condition profiles;
        if the user command matches one or more invalid commands, rejecting the user command and not executing the associated instructions; and
        if the user command does not match one or more invalid commands, accepting the user command and executing the associated instructions to activate the one or more ventilation systems.

2. The system of claim 1, wherein the sensor system comprises at least one sensor apparatus comprising:
    a housing including:
        an intake end;
        an exhaust end opposite the intake end; and
        an axial passageway defined in the housing and extending from the intake end to the exhaust end;
    a sensor positioned in the axial passageway; and
    at least one electrical component positioned in the axial passageway nearer the exhaust end than the sensor, the at least one electrical component configured to create a temperature differential between the intake end and the exhaust end such that air drafts past the sensor.

3. The system of claim 2, the sensor apparatus further comprising one or more display portions effective to display alphanumeric messages and disposed on the outside of the housing.

4. The system of claim 2, wherein the temperature differential is due to waste heat created by the at least one electrical component.

5. The system of claim 2, the sensor apparatus further comprising at least one filter covering at least a portion of the axial passageway.

6. The system of claim 2, the sensor apparatus further comprising a fan disposed in the axial passageway to further cause air to draft past the sensor.

7. The system of claim 1, wherein the sensor system further comprises a temperature sensor and the ventilation system comprises one or more components selected from the following:
    a fan;
    a heating element; and
    a refrigeration system.

8. The system of claim 7, the controller further directing the performance of operations comprising:
    monitoring a temperature within the facility via the temperature sensor;
    comparing the monitored temperature to one or more predetermined temperature thresholds; and
    for monitored temperatures in excess of the one or more temperature thresholds, generating and forwarding an alert by means of the wireless communications network to the user's mobile device.

9. The system of claim 1, the controller further directing the performance of operations comprising:
    for the duration the threshold is exceeded, maintaining an activated state of the one or more ventilation systems; and
    when the threshold is no longer exceeded, temporarily disabling one or more of the ventilation systems.

10. The system of claim 1, further comprising:
a plurality of devices each comprising a local communications module functionally linked to a local network; and
at least a first device comprising a master device, a remaining one or more of the plurality of devices comprising slave devices effective to send data to the master device via the local network, the first device further comprising:
a remote communications module functionally linked to the user's mobile device via the wireless communications network; and
the controller operatively linked to the at least one gas sensor and the local and remote communications module, the controller effective to:
receive a predetermined gas concentration threshold data string transmitted from the user's mobile device via the wireless communications network;
generate a return data string based on gas levels data sensed by the at least one gas sensor; and
transmit the return data string across the wireless communications network via the remote communications module to the user's mobile device.

11. The system of claim 10, wherein the master device comprises one or more display portions effective to display alphanumeric messages based on the gas levels data sensed by the at least one gas sensor.

12. The system of claim 10, wherein the controller of the master device is further effective to transmit data via the local network to each of the slave devices and the slave devices are further effective to exchange data with the master device via the local network.

13. The system of claim 1, further comprising a plurality of devices, each device including:
a remote communications module functionally linked to the user's mobile device via the wireless communications network; and
a controller operatively linked to the at least one gas sensor and the remote communications module, the controller effective to:
receive a predetermined gas concentration threshold string transmitted from the user's mobile device via the wireless communications network;
generate a return data string based on gas levels data sensed by the at least one gas sensor; and
transmit the return data string across the wireless communications network via the remote communications module to the user's mobile device.

14. The system of claim 13, wherein each device further includes one or more display portions effective to display alphanumeric messages based on the gas levels data sensed by the at least one gas sensor.

15. A method comprising:
monitoring a concentration of gas within a facility via one or more gas sensors;
comparing the monitored concentration of gas to a predetermined gas concentration threshold;
for monitored concentrations of gas in excess of the predetermined gas concentration threshold, generating and forwarding an alert by means of a wireless communications network to a user's mobile device;
monitoring for a user command received from the user's mobile device via the wireless communications network;
for the user command, determining associated instructions to be executed;
executing the associated instructions to activate or deactivate one or more ventilation systems;
determining one or more ambient condition profiles from at least the concentration of gas, the ambient condition profile comprising one or more associated invalid commands;
comparing the user command to the one or more invalid commands of the one or more determined ambient condition profiles;
if the user command matches one or more invalid commands, rejecting the user command and not executing the associated instructions; and
if the user command does not match one or more invalid commands, accepting the user command and executing the associated instructions to activate the one or more ventilation systems.

16. The method of claim 15, the method further comprising:
monitoring a temperature within the facility via a temperature sensor;
comparing the monitored temperature to one or more predetermined temperature thresholds; and
for monitored temperatures in excess of the one or more temperature thresholds, generating and forwarding an alert by means of a wireless communications network to a user's mobile device.

17. The method of claim 15, the method further comprising:
for a duration the threshold is exceeded, maintaining an activated state of the one or more ventilation systems; and
when the threshold is no longer exceeded, temporarily disabling one or more of the ventilation systems.

18. The method of claim 15, wherein the wireless communications network comprises at least a cellular communications network.

* * * * *